(12) United States Patent
Xu et al.

(10) Patent No.: US 10,778,319 B2
(45) Date of Patent: *Sep. 15, 2020

(54) INTERACTION METHOD AND COMMUNICATION DEVICE

(71) Applicant: Beijing Zhigu Rui Tuo Tech Co., Ltd, Beijing (CN)

(72) Inventors: Ran Xu, Beijing (CN); Dayong Ding, Beijing (CN)

(73) Assignee: Beijing Zhigu Rui Tuo Tech Co., Ltd, Beijing (CN)

( * ) Notice: Subject to any disclaimer, the term of this patent is extended or adjusted under 35 U.S.C. 154(b) by 211 days.

This patent is subject to a terminal disclaimer.

(21) Appl. No.: 15/192,980

(22) Filed: Jun. 24, 2016

(65) Prior Publication Data

US 2016/0380691 A1    Dec. 29, 2016

(30) Foreign Application Priority Data

Jun. 25, 2015 (CN) .......................... 2015 1 0358032

(51) Int. Cl.
| | | |
|---|---|---|
| *H04B 7/10* | (2017.01) | |
| *H04B 7/0495* | (2017.01) | |
| *G01S 5/02* | (2010.01) | |
| *H04W 64/00* | (2009.01) | |

(52) U.S. Cl.
CPC .............. *H04B 7/10* (2013.01); *G01S 5/0205* (2013.01); *H04B 7/0495* (2013.01); *H04W 64/006* (2013.01)

(58) Field of Classification Search
None
See application file for complete search history.

(56) References Cited

U.S. PATENT DOCUMENTS

| | | |
|---|---|---|
| 6,738,044 B2 | 5/2004 | Holzrichter et al. |
| 7,030,761 B2 | 4/2006 | Bridgelall et al. |
| 7,193,504 B2 | 3/2007 | Carrender et al. |
| 8,115,753 B2 | 2/2012 | Newton |
| 8,432,929 B2 | 4/2013 | Wilson et al. |

(Continued)

FOREIGN PATENT DOCUMENTS

| | | |
|---|---|---|
| CN | 101271620 A | 9/2008 |
| CN | 102520798 A | 6/2012 |

(Continued)

OTHER PUBLICATIONS

Office Action dated Jan. 5, 2018 for U.S. Appl. No. 15/192,956, 28 pages.

(Continued)

*Primary Examiner* — Jeffrey M Rutkowski
*Assistant Examiner* — Basil Ma
(74) *Attorney, Agent, or Firm* — Amin, Turocy & Watson, LLP (57) ABSTRACT

An interaction method and communication device are provided. An interaction method comprises: sending multiple different signals by a communication device, wherein the multiple different signals have different coverage areas, at least determining at least two signals in the multiple different signals received by another communication device, and at least according to the at least two signals, determining a moving track of the other communication device. An interaction solution is thus provided.

32 Claims, 5 Drawing Sheets

(56) References Cited

U.S. PATENT DOCUMENTS

| | | |
|---|---|---|
| 8,791,901 B2 | 7/2014 | Mallinson |
| 8,994,583 B2 | 3/2015 | Bruce |
| 9,560,445 B2 | 1/2017 | Raghuvanshi et al. |
| 9,848,252 B2 | 12/2017 | Eggers et al. |
| 9,921,657 B2 | 3/2018 | Sprenger et al. |
| 9,921,660 B2 | 3/2018 | Poupyrev |
| 9,971,414 B2 | 5/2018 | Gollakota et al. |
| 2006/0022815 A1 | 2/2006 | Fischer et al. |
| 2011/0070840 A1 | 3/2011 | Nielsen et al. |
| 2012/0015684 A1 | 1/2012 | Noji |
| 2012/0213181 A1 | 8/2012 | Walton et al. |
| 2013/0106898 A1 | 5/2013 | Saint-Loubert-Bie et al. |
| 2013/0120250 A1 | 5/2013 | Lin et al. |
| 2013/0278504 A1 | 10/2013 | Tong et al. |
| 2015/0131750 A1* | 5/2015 | Xue .................. H04B 7/0482 375/267 |
| 2016/0062488 A1* | 3/2016 | Zhao .................. G06F 3/0386 345/163 |
| 2017/0117891 A1* | 4/2017 | Lohbihler ............ G08C 17/02 |

FOREIGN PATENT DOCUMENTS

| | | |
|---|---|---|
| CN | 103502911 A | 1/2014 |
| CN | 203416263 U | 1/2014 |
| CN | 103593126 A | 2/2014 |
| CN | 103604272 A | 2/2014 |
| CN | 103731711 A | 4/2014 |
| CN | 103944282 A | 7/2014 |
| CN | 104615005 A | 5/2015 |
| WO | 2013063372 A | 5/2013 |

OTHER PUBLICATIONS

Tse, et al., "Fundamentals of Wireless Communication," May 26, 2005 Cambridge University Press, 3 pages.
Office Action dated May 31, 2018 for U.S. Appl. No. 15/192,968, 34 pages.
Office Action dated Jul. 6, 2018 for U.S. Appl. No. 15/192,956, 20 pages.
Office Action dated Oct. 25, 2018 for U.S. Appl. No. 15/192,956, 22 pages.
Office Action dated Nov. 29, 2018 for U.S. Appl. No. 15/192,968, 30 pages.
Notice of Allowance received for U.S. Appl. No. 15/192,956 dated Jun. 24, 2019, 29 pages.
Office Action dated Apr. 2, 2019 for U.S. Appl.No. 15/192,956, 35 pages.
Chinese Office Action for Chinese Application Serial No. 201510358060.5 dated Mar. 1, 2019, 7 pages.
Office Action dated Apr. 17, 2019 for U.S. Appl. No. 15/192,968, 34 pages.
Final Office Action received for U.S. App. No. 15/192,968 dated Oct. 4, 2019, 34 pages.
Chinese Office Action for Chinese Application Serial No. 201510357562.6 dated Nov. 29, 2018, 9 pages.
Chinese Office Action for Chinese Application Serial No. 201510358032.3 dated Nov. 28, 2018, 9 pages.

* cited by examiner

INTERACTION METHOD AND COMMUNICATION DEVICE

RELATED APPLICATION

The present application claims the benefit of priority to Chinese Patent Application No. 201510358032.3, filed on Jun. 25, 2015, and entitled "Interaction Method and Communication Device", which application is hereby incorporated into the present application by reference herein in its entirety.

TECHNICAL FIELD

Embodiments of the present application relate to the technical field of interaction, and, for example, to an interaction method and a communication device.

RELATED ART

Interaction between men and devices and interaction between the devices can be implemented in many manners. One vision-based interaction manner is that one device collects an image of a user or another device by a depth sensor to interact with the user or another device, and such interaction manner has high requirements on calculating complexity and hardware complexity of image collecting. In addition, use of wireless signals for interaction gains more and more attention of people, for example, a user action is recognized by detecting reflection echo features of a directionally sent wireless signal wave beam, thereby realizing the interaction with the user, but a transmission distance of reflected signal is limited generally, and recognition precision is related to the distance, so that application thereof is limited.

SUMMARY

Considering this, an example, non-limiting object of example embodiments of the present application aims to provide an interaction solution.

A first aspect of example embodiments of the present application provides an interaction method, comprising:

sending multiple different signals by a communication device, wherein the multiple different signals have different coverage areas;

at least determining at least two signals in the multiple different signals received by another communication device; and at least according to the at least two signals, determining a moving track of the other communication device.

A second aspect of example embodiments of the present application provides a communication device, comprising:

a sending module, configured to send multiple different signals, wherein the multiple different signals have different coverage areas;

a first determining module, configured to at least determine at least two signals in the multiple different signals received by another communication device; and a second determining module, configured to, at least according to the at least two signals, determine a moving track of the other communication device.

A third aspect of example embodiments of the present application provides a communication device, comprising:

at least one signal emitting source:

a memory, configured to store at least one program; and a processor, configured to execute the at least one program stored by the memory wherein the at least one program enables the processor to execute following operations:

controlling the at least one signal emitting source to send multiple different signals by, wherein the multiple different signals have different coverage areas;

at least determining at least two signals in the multiple different signals received by another communication device; and at least according to the at least two signals, determining a moving track of the other communication device.

At least one of above example embodiments has the following technical effects:

According to example embodiments of the present application, by sending multiple different signals having different coverage areas by a communication device, at least determining at least two signals in the multiple different signals received by another communication device, and at least according to the at least two signals, determining a moving track of the other communication device, the interaction solution is provided. In addition, the moving track of the other communication device is determined based on the signals received by the other communication device from the communication device, therefore interaction distance is relatively flexible and the interaction solution is easy to realize.

DETAILED DESCRIPTION

The following further explains example embodiments of the present application in combination with accompanying drawings and embodiments. The following embodiments are intended to describe the present application rather than limiting a scope of the present application.

Figure 1:
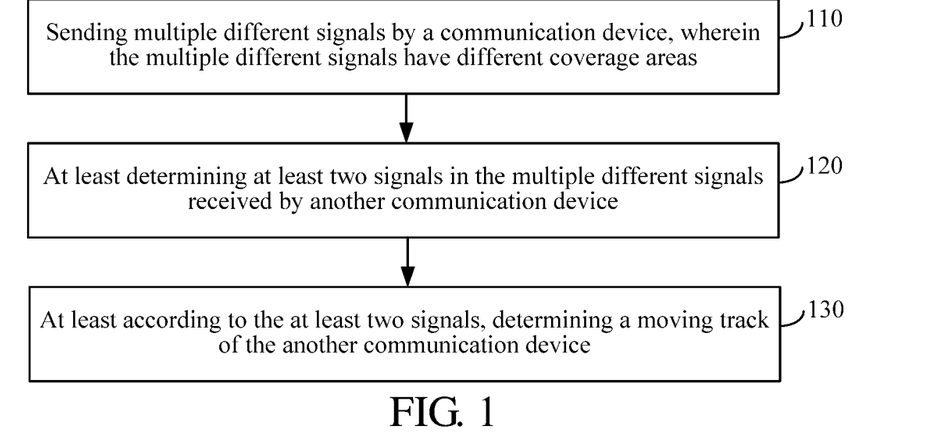
FIG. 1 is a flow schematic diagram of an example embodiment of an interaction method provided by the present application.

FIG. 1 is a flow schematic diagram of an embodiment of an interaction method provided by the present application. As shown in FIG. 1, the present embodiment comprises:

110: sending multiple different signals by a communication device, wherein the multiple different signals have different coverage areas.

In the present embodiment, the communication device can be any device with a communication function, which comprises but not limited to a cellphone, a tablet computer, a smart television, a wearable device and a display.

In the present embodiment, the word "different" in the phase "multiple different signals" means that the multiple different signals carry different information.

In the present embodiment, the multiple different signals may be signals in any form. Optionally, the multiple different signals comprise but not limited to any one of the following: electromagnetic wave signals, light signals and sound wave signals, wherein the light signals comprise visible light signals and invisible light signals, and the sound wave signals comprise but not limited to ultrasonic wave signals.

Figure 2A:
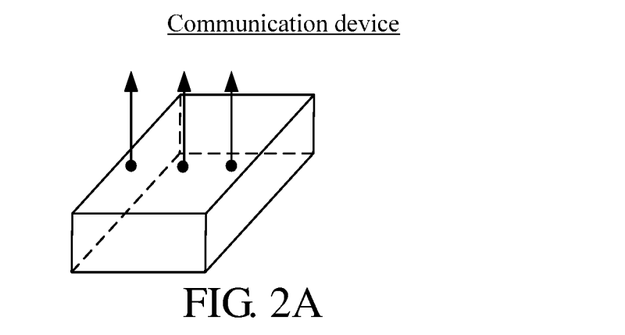
FIG. 2A-FIG. 2C each are example schematic diagrams of directions that each signal emitting source sends signal(s) in the present application.
Figure 2B:
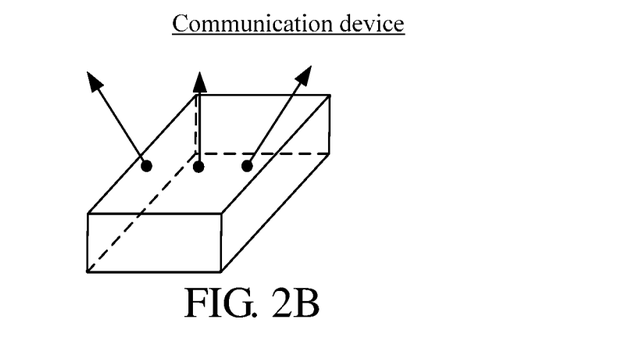
Figure 2C:
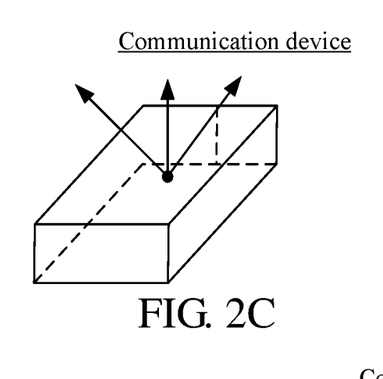

In the present embodiment, the communication device is usually provided with at least one signal emitting source, and the communication device specifically send the multiple different signals by the at least one signal emitting source. The type of the at least one signal emitting source relates to that of the multiple different signals emit by the at least one signal emitting source. Specifically, a signal emitting source emitting electromagnetic wave signals can be an antenna or an antenna array; a signal emitting source emitting light signals can be a light source or a light source array, for example a LED light source or a LED light source array in an organic light-emitting diode (OLED) display or a light-emitting diode (LED) display; and a signal emitting source emitting sound wave signals can be a loudspeaker or a loudspeaker array. For example, the multiple different signals are visible light signals, the at least one signal emitting sources is multiple LED light sources corresponding to different display regions in a display, correspondingly, the sending multiple different signals by a communication device specifically comprises: sending multiple visible light signals by the communication device through multiple LED light sources corresponding to different display regions in a display. In addition, sending directions of the multiple different signals are optionally same or different. As shown in FIG. 2A, multiple signal emitting sources (shown by black dots in the figure, the same below) respectively send signals in a same direction, that is, the sending directions of the multiple different signals are parallel; and as shown in FIG. 2B, multiple signal emitting sources respectively send signals in different directions; and as shown in FIG. 2C, one signal emitting source sends at least two signals in at least two different directions.

In the present embodiment, the case that the multiple different signals have different coverage areas means that respective coverage areas of the multiple different signals are totally non-overlapped or the coverage areas of at least two signals are partially overlapped, in addition, the coverage areas of any two signals in the multiple different signals do not have an inclusion relation.

120: at least determining at least two signals in the multiple different signals received by another communication device.

In the present embodiment, the other communication device can be any device with a communication function, which comprises but not limited to a cellphone and a wearable device.

130: at least according to the at least two signals, determining a moving track of the other communication device.

In the present embodiment, since the multiple different signals have different coverage areas, the other communication device respectively receives the at least two signals in at least two positions which are different relative to the communication device, and correspondingly, the at least two signals at least partially mark a moving track of the other communication device relative to the communication device. For example, the other communication device receives a signal A in a first position relative to the communication device and receives signals B and C in a second position relative to the communication device, then the signal A and signals B and C at least partially mark the moving track of the other communication device relative to the communication device.

According to the embodiment, by sending multiple different signals having different coverage areas by a communication device, at least determining at least two signals in the multiple different signals received by another communication device, and at least according to the at least two signals, determining a moving track of the other communication device, the interaction solution is provided. In addition, the moving track of the other communication device is determined based on the signals received by the other communication device from the communication device, therefore interaction distance is relatively flexible and the interaction solution is easy to realize.

The method of the present embodiment is further described in some optional example embodiments as below.

In the present embodiment, the multiple different signals can be transmitted in multiple forms.

In one example embodiment, the multiple different signals are transmitted in a form of wave beam, correspondingly, the sending multiple different signals by a communication device comprises:

sending multiple different signals through multiple wave beams by the communication device, wherein the multiple wave beams are formed by at least one signal emitting source of the communication device.

Any signal emitting source in the at least one signal emitting source optionally forms one wave beam or at least two wave beams. If one signal emitting source forms at least two wave beams, then the at least wave beams are different in direction.

Similar to the coverage areas of the multiple different signals, the multiple wave beams are different in coverage area.

The type of the multiple wave beams relates to that of the multiple different signals. For example, the multiple different signals are electromagnetic wave signals, and the multiple wave beams are electromagnetic wave beams; the multiple different signals are light signals, and the multiple wave beams are optical wave beams; and the multiple different signals are sound wave signals, and the multiple wave beams are sound wave beams. Correspondingly, along with difference of the type of the multiple wave beams, the communication device can form the multiple wave beams by adopting different techniques; by taking the electromagnetic wave beams as an example, the communication device can form the multiple electromagnetic wave beams by adopting an antenna array and a wave beam forming technique. Further, the multiple wave beams can be formed at the same time or different moments, for example, in sequence.

The multiple different signals can be sent through the multiple wave beams at the same time or different moments, for example, in sequence.

The multiple wave beams correspond to the multiple different signals one to one, that is, the communication device sends a signal through each wave beam.

In the present example embodiment, optionally, before sending multiple different signals through multiple wave beams by the communication device, the method further comprises:

determining the multiple wave beams to be formed by the at least one signal emitting source by the communication device.

The coverage area of each wave beam determines the coverage area of the signal sent through the wave beam, and the coverage area of each wave beam is usually decided by position of a signal emitting source forming the wave beam and direction and width of the wave beam. Correspondingly, the determining the multiple wave beams to be formed by the at least one signal emitting source by the communication device comprises: determining the at least one signal emitting source for forming the multiple wave beams, and directions and widths of the multiple wave beams by the communication device. Optionally, a projection direction of one light source can serve as the direction of the wave beam formed by the light source. By taking an electromagnetic wave beam as an example, width of the wave beam comprise a horizontal width and a vertical width.

Specifically, the communication device can determine the multiple wave beams to be formed by the at least one signal emitting source in many manners.

Figure 3A:
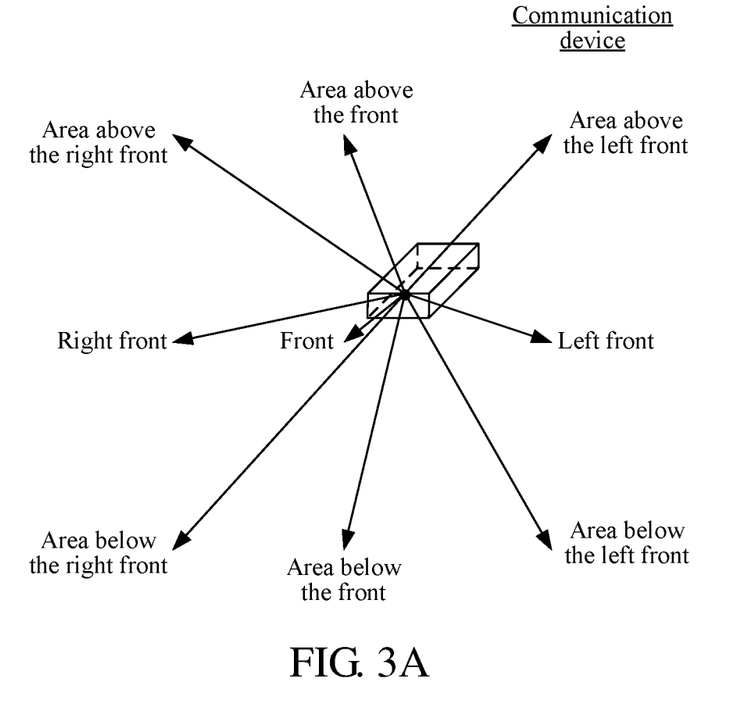
FIG. 3A is an example schematic diagram of directions of multiple wave beams formed by one signal emitting source in the present application.

In one possible scene, the multiple wave beams to be formed by the at least one signal emitting source are preset. For example, there are five signal emitting sources in the communication device, and each of the five signal emitting sources is preset to form one wave beam in preset direction and preset width. For another example, one signal emitting source of the communication device can form multiple wave beams of different directions, and the directions and widths of the multiple wave beams formed by the signal emitting source are preset; as shown in FIG. 3A, the directions of nine wave beams formed by one signal emitting source (shown by a black dot in the figure) of the communication device respectively point to the front, an area above the front, an area below the front, the left front, an area above the left front, an area below the left front, the right front, an area above the right front, and an area below the right front of the signal emitting source.

In another possible scene, the communication device determines the multiple wave beams to be formed by the at least one signal emitting source according to possible moving tracks of the other communication device. Correspondingly, the determining the multiple wave beams to be formed by the at least one signal emitting source by the communication device comprises:

determining multiple possible moving tracks of the other communication device; and determining the multiple wave beams to be formed by the at least one signal emitting source according to the multiple possible moving tracks, wherein, each possible moving track corresponds to at least two wave beams in the multiple wave beams.

The determining the multiple wave beams to be formed by the at least one signal emitting source according to the multiple possible moving tracks at least comprises: determining the at least one signal emitting source for forming the multiple wave beams and directions of the multiple wave beams according to the multiple moving tracks. In addition, the widths of the multiple wave beams can be preset or determined according to the multiple possible moving tracks.

The multiple possible moving tracks of the other communication device are the possible moving tracks of the other communication device relative to the communication device; the multiple possible moving tracks of the other communication device are optionally pre-agreed. For example, the communication device is a cellphone, a signal emitting source A is arranged at one surface of the communication device, and all multiple possible moving tracks comprise: a transverse moving track parallel with the surface, a vertical moving track parallel with the surface and an L shaped moving track parallel with the surface, which are shown by dotted lines in FIG. 3B.

Figure 3B:
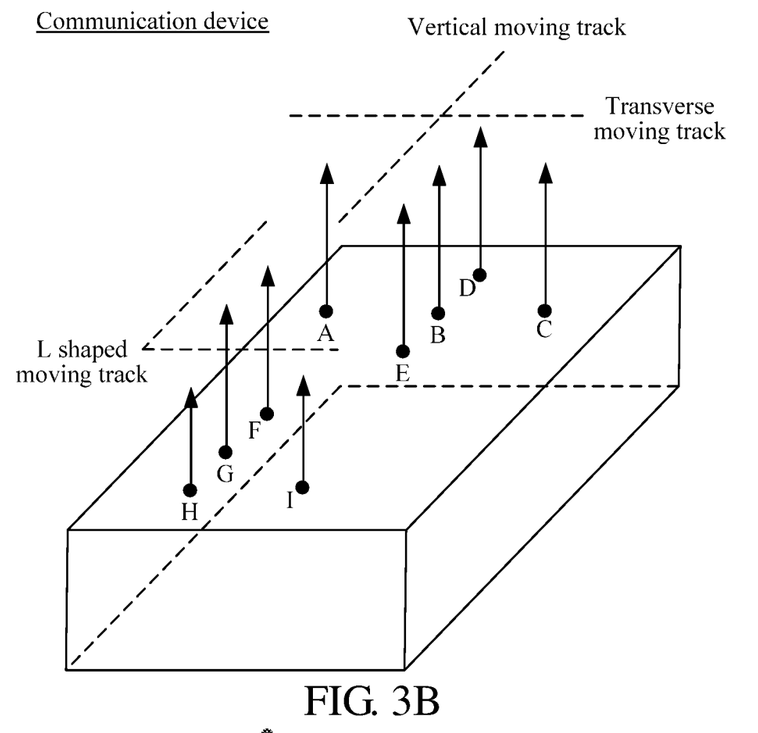
FIG. 3B is an example schematic diagram of multiple possible moving tracks and multiple wave beams determined according to the multiple possible moving tracks in the present application.

The case that each possible moving track corresponds at least two wave beams in the multiple wave beams means that each possible moving track at least passes by the at least two coverage areas of the at least two wave beams. Specifically, each possible moving track is optionally marked by the at least two coverage areas of the at least two wave beams, or the at least two coverage areas of the at least two wave beams and a passing sequence that the other communication device passes by the at least two coverage areas of the at least two wave beams. In the above example, further, according to the transverse moving track, three signal emitting sources A, B and C arrayed in a column and opposite to the transverse moving track are determined, and it is determined that directions of three wave beams to be respectively formed by the three signal emitting sources A, B and C are vertical to the surface, as shown in FIG. 3B; according to the vertical moving track, three signal emitting sources D, B and E arrayed in a column and opposite to the vertical moving track are determined, and it is determined that directions of three wave beams to be respectively formed by the three signal emitting sources D, B and E are vertical to the surface, as shown in FIG. 3B; and according to the L shaped moving track, four signal emitting sources F, G, H and I arrayed in a circle and opposite to the L shaped moving track are determined, and it is determined that directions of four wave beams to be respectively formed by the four signal emitting sources F, G, H and I are vertical to the surface, as shown in FIG. 3B.

In the above scene(s) of determining the multiple wave beams according to possible moving tracks, the determining multiple possible moving tracks can be implemented in multiple manners.

Optionally, the determining multiple possible moving tracks of the other communication device comprises:

at least according to a current position of the other communication device relative to the communication device, determining the multiple possible moving tracks of the other communication device.

The current position is optionally detected and determined by the communication device.

The current position can serve as one reference of the multiple possible moving tracks. Optionally, the multiple possible moving tracks each take the current position as starting points.

Optionally, the multiple possible moving tracks are preset and are unrelated to the current position of the other communication device relative to the communication device.

In the present embodiment, the moving track of the other communication device determined in 103 is optionally determined according to the at least two signals received by the other communication device only, or according to the at least two signals received by the other communication device and a receiving sequence that the other communication device receives the at least two signals. In the latter scene, optionally, the at least determining the at least two signals in the multiple different signals received by the other communication device comprises:

determining the at least two signals received by the other communication device and a receiving sequence that the other communication device receives the at least two signals;

the at least according to the at least two signals, determining a moving track of the other communication device comprises:

at least according to the at least two signals and the receiving sequence, determining a moving track of the other communication device.

The receiving sequence that the other communication device receives the at least two signals is equivalent to the passing sequence that the other communication device moves to the at least two coverage areas of the at least two signals. That is, the moving track of the other communication device is marked by the at least two coverage areas of the at least two signals and the passing sequence that the other communication device moves to the at least two coverage areas of the at least two signals.

The determining the at least two signals and a receiving sequence can be implemented in multiple manners.

Optionally, the determining the at least two signals received by the other communication device and a receiving sequence that the other communication device receives the at least two signals comprises:

receiving the at least two signals returned in sequence by the other communication device; and determining the receiving sequence as a returning sequence that the other communication device returns the at least two signals.

The other communication device returns the at least two signals received to the communication device in sequence according to the receiving sequence, for example, the other communication device instantly returns a signal to the communication device every time the other communication device receives the signal, correspondingly, for the communication device, the returning sequence that the other communication device returns the at least two signals is the receiving sequence that the other communication device receives the at least two signals.

The case that the other communication device returns the at least two signals optionally means that the other communication device returns the information carried in the at least two signals. For example, in 110, the multiple different signals sent by the communication device are multiple visible light signals, the at least two signals received by the other communication device are at least two visible light signals, correspondingly, the other communication device can directly return the at least two visible light signals received to the communication device, or demodulate the at least two visible light signals to obtain the information carried in the at least two visible light signals, carry the information in signals of any form, for example, the electromagnetic wave signals, sound wave signals and light signals, and return the signals carrying the information back to the communication device.

Optionally, the determining the at least two signals received by the other communication device and a receiving sequence that the other communication device receives the at least two signals comprises:

receiving the at least two signals and at least two receiving moments that the other communication device receives the at least two signals, which are both returned by the other communication device; and according to the at least two receiving moments, determining the receiving sequence.

The case that the other communication device returns the at least two signals optionally means that the other communication device returns the information carried in the at least two signals. For example, in 110, the multiple different signals sent by the communication device are multiple visible light signals, the at least two signals received by the other communication device are at least two visible light signals, correspondingly, the other communication device can directly return the at least two received visible light signals and the receiving moments of the at least two signals to the communication device, or demodulate the at least two visible light signals to obtain the information carried in the at least two visible light signals, carry the information and the receiving moments of the at least two signals in signals of any form, for example, the electromagnetic wave signals, sound wave signals and light signals, and return the signals carrying the information back to the communication device.

In the above scene(s), considering the receiving sequence, the at least according to the at least two signals and the receiving sequence, determining a moving track of the other communication device can be implemented in multiple manners.

Optionally, the at least according to the at least two signals and the receiving sequence, determining a moving track of the other communication device comprises:

determining at least two coverage areas of the at least two signals; and according to the at least two coverage areas of the at least two signals and the receiving sequence, determining a moving track of the other communication device.

The at least two coverage areas of the at least two signals can be marked in multiple manners, For example, in the scene(s) combining the above sending multiple different signals through multiple wave beams, the at least two coverage areas of the at least two signals are respectively equivalent to the at least two coverage areas of the at least two wave beams for sending the at least two signals, since the widths of the at least two wave beams are probably the same, if the at least two wave beams are formed by one signal emitting source, the at least two coverage areas of the at least two wave beams is optionally marked by the directions of the at least two wave beams only, if the at least two wave beams are formed by multiple signal emitting sources, each of the at least two coverage areas of the at least two wave beams is optionally marked by position of the signal emitting source for forming the wave beam and direction of the wave beam.

Figure 3C:
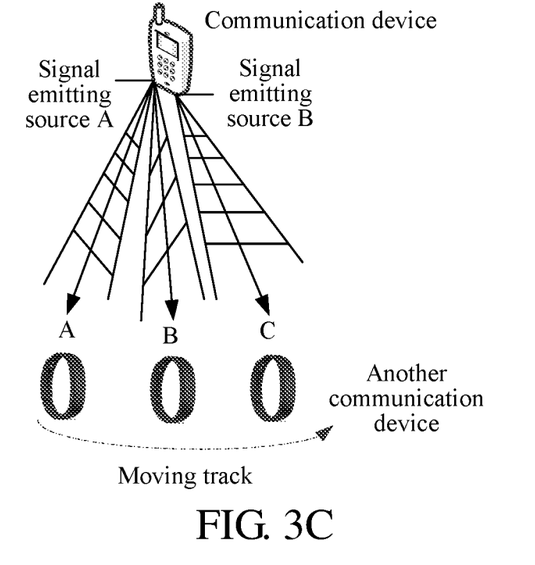
FIG. 3C is an example schematic diagram of a moving track of another communication device in the present application.

For example, the other communication device receives a first signal, a second signal and a third signal sent by the communication device in sequence, the communication device determines that a first wave beam for sending the first signal is formed by a signal emitting source A and has a direction A and a first width, a second wave beam for sending the second signal is formed by the signal emitting source A and has a direction B and a second width, and a third wave beam for sending the third signal is formed by the signal emitting source A and has a direction C and a third width, correspondingly, it is determined that the moving track of the other communication device is from the coverage area of the first wave to the coverage area of the third wave beam via the coverage area of the second wave beam, as shown by dotted lines in FIG. 3C, wherein the coverage area of the first wave beam is defined by the signal emitting source A, the direction A and the first width as shown by a backslash filling region in FIG. 3C, the coverage area of the second wave beam is defined by the signal emitting source A, the direction B and the second width as shown by a slash filling region in FIG. 3C, and the coverage area of the third wave beam is defined by the signal emitting source A, the direction C and the third width as shown by a horizontal stripe filling region in FIG. 3C.

In the scenes combining the above receiving sequence and the above determining the wave beams according to possible moving tracks, optionally, the method further comprises:

determining first sequences respectively corresponding to each of the multiple possible moving tracks;

aiming at each first sequence corresponding to one possible moving track, according to at least two wave beams corresponding to the possible moving track and a corresponding order of the at least two wave beams to the possible moving track, dividing the first sequences into at least two subsequences corresponding to the at least two wave beams one to one; and respectively modulating the at least two subsequences into at least two signals corresponding to the at least two wave beams.

Each possible moving track corresponds to one first sequence, and the first sequences corresponding to different possible moving tracks are different.

For any two possible moving tracks in the multiple possible moving tracks, at least two wave beams corresponding to one of the two possible moving tracks are optionally the same as or different from those corresponding to the other. In one possible scene, there are at least two possible moving tracks in the multiple possible moving tracks each of which corresponds to the same at least two wave beams, but the respective corresponding orders of the same at least two wave beams to the at least two possible moving tracks are different. In such scene, the first sequences corresponding to the at least two possible moving tracks are optionally related, and the above dividing and modulating can be performed against only one of the at least two possible moving track thereof. For example, two possible moving tracks each correspond to wave beams A, B and C, but the corresponding orders of the wave beams A, B and C to the two possible moving tracks are opposite, correspondingly, the first sequences corresponding to the two possible moving tracks are respectively {1,2,3} and {3,2,1}, correspondingly, the first sequence { 1,2,3} is divided into subsequences {1}, {2} and {3} corresponding to the wave beams A, B and C in sequence and the subsequences {1}, {2} and {3} are respectively modulated into signals corresponding to the wave beams A, B and C, and in addition, it is unnecessary to perform the dividing and modulating against the first sequence {3,2,1}.

One signal corresponding to each wave beam is a signal to be sent through the wave beam in 110.

In the scene(s) combining the above receiving sequence and the above dividing the first sequence, optionally, the determining the at least two signals received by the other communication device and a receiving sequence that the other communication device receives the at least two signals comprises:

receiving a second sequence from the other communication device, wherein the second sequence is make up of at least two subsequences carried in the at least two signals according to the receiving sequence by the other communication device.

Further, the at least according to the at least two signals and the receiving sequence, determining the moving track of the other communication device comprises:

determining the moving track of the other communication device as one possible moving track corresponding to the second sequence.

The second sequence is optionally the same as a first sequence corresponding to one of the multiple possible moving tracks. For example, when the other communication device moves along any one possible moving track in the multiple possible moving tracks, the second sequence is the same as a first sequence, which means that the possible moving track corresponding to the second sequence is one possible moving track corresponding to the first sequence.

The second sequence is optionally different from any first sequence corresponding to one of the multiple possible moving tracks. For example, when the other communication device does not move along any one possible moving track in the multiple possible moving tracks, the second sequence is different from any first sequence corresponding to one of the multiple possible moving tracks, which means that the second sequence does not correspond to any possible moving track of the multiple possible moving tracks, correspondingly, it is determined that the moving track of the other communication device is different from any one of the multiple possible moving tracks.

In the scene(s) combining the above receiving sequence and the above dividing the first sequence, optionally, the at least according to the at least two signals and the receiving sequence, determining the moving track of the other communication device comprises:

combining at least two subsequences carried in the at least two signals into a third sequence according to the receiving sequence; and determining the moving track of the other communication device as one possible moving track corresponding to the third sequence.

The third sequence is optionally same as a first sequence corresponding to one of the multiple possible moving tracks. For example, when the other communication device moves along any one possible moving track in the multiple possible moving tracks, the third sequence is the same as a first sequence corresponding to one of the multiple possible moving tracks, which means that the possible moving track corresponding to the third sequence is one possible moving track corresponding to the first sequence.

The third sequence is optionally different from any first sequence corresponding to one of the multiple possible moving tracks. For example, when the other communication device does not move along any one possible moving track in the multiple possible moving tracks, the third sequence is different from any first sequence in the multiple first sequences, then the third sequence does not correspond to corresponding to one of the multiple possible moving tracks, which means that the third sequence does not correspond to any possible moving track of the multiple possible moving tracks, correspondingly, it is determined that the moving track of the other communication device is different from any one of the multiple possible moving tracks.

In the above example embodiment of sending multiple different signals through multiple wave beams, the communication device sends the multiple different signals through the multiple wave beams optionally at different moments.

Further in combination with the scene(s) of determining the wave beams according to the possible moving tracks, optionally, in at least two wave beams corresponding to each possible moving track, the communication device sends a signal through an initial wave beam, and then sends another signal through the next wave beam after acknowledging that the other communication device receives the signal sent through the initial wave beam, and so on. Correspondingly, the sending multiple different signals through multiple wave beams by the communication device comprises: sending at least one first signal through at least one first wave beam by the communication device, wherein the at least one first wave beam comprises at least one initial wave beam in at least two wave beams corresponding to each of the multiple possible moving tracks;

the determining the at least two signals received by the other communication device and a receiving sequence that the other communication device receives the at least two signals comprises: receiving from the other communication device a first acknowledging signal for acknowledging a first signal;

the sending multiple different signals through multiple wave beams by the communication device further comprises: sending at least one second signal through at least one second wave beam by the communication device, the at least one second wave beam comprises at least one next wave beam of a first wave beam in at least one possible moving track, the first signal received by the other communication device is sent through the first wave beam by the communication device, each of the at least one possible moving track takes the first wave beam as the initial wave beam;

the determining the at least two signals received by the other communication device and a receiving sequence that the other communication device receives the at least two signals further comprises: receiving from the other communication device a second acknowledging signal for acknowledging a second signal.

In at least two wave beams corresponding to each possible moving track, if moving along the possible moving track, the other communication device usually arrives at the coverage area of the initial wave beam firstly and then enters the coverage area of the next wave beam of the initial wave beam, and so on.

The at least one first wave beam can be one first wave beam or multiple first wave beams. Specifically, if each of the multiple possible moving tracks takes the same wave beam as the initial wave beam, then the at least one first wave beam is one first wave beam, that is the same wave beam; and if at least two possible moving tracks in the multiple possible moving tracks take different wave beams as the initial wave beams, then the at least one first wave beam is multiple first beams.

The at least one second wave beam can be one second wave beam or multiple second wave beams. Specifically, if only one possible moving track in the multiple possible moving tracks takes the first wave beam as the initial wave beam, or the next wave beams of the first wave beam in the at least two possible moving tracks taking the first wave beam as the initial wave beams are same, the first signal the other communication device receives is sent through the first wave beam, then the at least one second wave beam is one second wave beam; and if the next wave beams of the first wave beam in the at least two possible moving tracks taking the first wave beam as the initial wave beams are different, then the at least one second wave beam is multiple second wave beams.

Further, if at least two possible moving tracks in the multiple possible moving tracks each take the first wave beam as the initial wave beam and a second wave beam as the next wave beam of the initial wave beam, the second signal the other communication device receives is sent through the second wave beam, then the sending multiple different signals through multiple wave beams by the communication device optionally further comprises: sending at least one third signal through at least one third wave beam by the communication device, wherein the at least one third wave beam comprises at least one next wave beam of a second wave beam in at least one possible moving track, the at least one possible moving track each takes the first wave beam as the initial wave beam and the second wave beam as the next wave beam of the initial wave beam, the second signal the other communication device receives is sent through the second wave beam by the communication device; the determining the at least two signals received by the other communication device and a receiving sequence that the other communication device receives the at least two signals further comprises: receiving from the other communication device a third acknowledging signal for acknowledging a third signal.

In the present embodiment, the moving track of the other communication device determined in 130 has multiple purposes. In one possible scene, the moving track of the other communication device serves as information input into the communication device, correspondingly, after 130, the method further comprises: determining input information by the communication device at least according to the moving track of the other communication device. In another possible scene, the moving track of the other communication device is used for controlling the communication device to execute a corresponding command, correspondingly, after 130, the method further comprises: executing a corresponding command by the communication device at least according to the moving track of the other communication device.

In one application scene of the present embodiment, a cellphone placed on a desk by a user is taken as the communication device in the present embodiment, a smart bracelet worn on a wrist of the user is taken as the other communication device in the present embodiment; when the user cooks, the cellphone on the desk receives a call, the cellphone sends multiple different signals in multiple directions, if the user does not want to answer the call and does not want to touch the cellphone, the user can only slide the worn smart bracelet along a certain track, the smart bracelet receives at least two signals in the multiple different signals in a corresponding receiving sequence in the process of sliding along the certain track, in addition, every time the smart bracelet receives one signal, the signal is returned to the cellphone instantly, and the cellphone determines the at least two signals received by the smart bracelet and a receiving sequence that the smart bracelet receives the at least two signals, and then determines a moving track of the other communication device, thereby executing a corresponding command, that is, call refusing.

In another application scene of the present embodiment, one electronic advertisement board serves as the communication device in the present embodiment, which adopts an LED array display, a cellphone of a user is taken as the other communication device in the present embodiment; when the user comes to the electronic advertisement board, the LED array display in the electronic advertisement board displays a commodity and multiple LED light sources corresponding to different display regions in the LED array display send multiple different visible light signals in an outward direction vertical to a display plane, if the user is interested in the commodity being displayed by the LED array display and wants to know about position information of the commodity, then the user can hold the cellphone to transversely slide in front of the electronic advertisement board, in the transversely sliding process, the cellphone receives at least two visible light signals sent by at least two LED light sources in a corresponding receiving sequence, in addition, every time the cellphone receives one visible light signal, the visible light signal is returned to the electronic advertisement board instantly, and the electronic advertisement board determines the at least two visible light signals received by the cellphone and a receiving sequence that the cellphone receives the at least two visible light signals, and then determines a moving track of the other communication device, thereby executing a corresponding command, that is, displaying the position information of the commodity; if the user is interested in the commodity being displayed by the LED array display and wants to know about discounting information of the commodity, then the user can hold the cellphone to vertically slide in front of the LED array display, in the vertically sliding process, the cellphone receives at least two visible light signals sent by at least two LED light sources in a corresponding receiving sequence, in addition, every time the cellphone receives one visible light signal, the visible light signal is returned to the electronic advertisement board instantly, and the electronic advertisement board determines the at least two visible light signals received by the cellphone and a receiving sequence that the cellphone receives the at least two visible light signals, and then determines a moving track of the other communication device, thereby executing a corresponding command, that is, displaying the discounting information of the commodity.

In another application scene of the present embodiment, an electronic drawing board serves as the communication device in the present embodiment, the electronic drawing board adopts an LED array display, each LED light source in the LED array display sends multiple visible light signals in an outward direction vertical to a display plane, a cellphone of a user is taken as the other communication device in the present embodiment, when the user comes to the electronic drawing board, the user draws a pattern in front of the LED array display by using the cellphone as a brush, correspondingly, in the drawing process, the cellphone receives at least two visible light signals sent by at least two LED light sources in a corresponding receiving sequence, in addition, every time the cellphone receives one visible light signal, the cellphone immediately returns the visible light signal to the electronic drawing board instantly, the electronic drawing board determines the at least two visible light signals and the receiving sequence that the cellphone receives the at least two visible light signals and then determines a moving track of the cellphone, thereby displaying the pattern drawn by the moving track of the cellphone on the LED array display.

Figure 4:
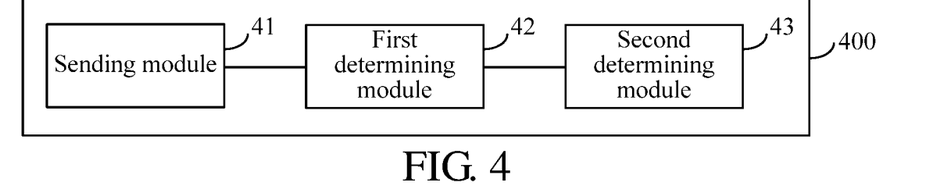
FIG. 4 is a structural schematic diagram of a first example embodiment of a communication device provided by the present application.

FIG. 4 is a structural schematic diagram of a first embodiment of a communication device provided by the present application. As shown in FIG. 4, the communication device comprises:

a sending module 41, configured to send multiple different signals, wherein the multiple different signals have different coverage areas;

a first determining module 42, configured to at least determine at least two signals in the multiple different signals received by another communication device; and a second determining module 43, configured to, at least according to the at least two signals, determine a moving track of the other communication device.

In the present embodiment, the word "different" in the phase "multiple different signals" means that the multiple different signals carry different information.

In the present embodiment, the communication device 400 can be any device with a communication function, which comprises by not limited to a cellphone, a tablet computer, a smart television, a wearable device and a display.

In the present embodiment, the multiple different signals may be signals in any form. Optionally, the multiple different signals comprise but not limited to any one of the following: electromagnetic wave signals, light signals and sound wave signals, wherein the light signals comprise visible light signals and invisible light signals, and the sound wave signals comprise but not limited to ultrasonic wave signals.

In the present embodiment, the communication device 400 is usually provided with at least one signal emitting source, and the sending module 41 specifically sends the multiple different signals by the at least one signal emitting source. The type of the at least one signal emitting source relates to that of the multiple different signals emit by the at least one signal emitting source. Specifically, a signal emitting source emitting electromagnetic wave signals can be an antenna or an antenna array; a signal emitting source emitting light signals can be a light source or a light source array, for example a LED light source or a LED light source array in an organic light-emitting diode (OLED) display or a light-emitting diode (LED) display; and a signal emitting source emitting sound wave signals can be a loudspeaker or a loudspeaker array. For example, the multiple different signals are visible light signals, the at least one signal emitting sources is multiple LED light sources corresponding to different display regions in a display, correspondingly, the sending module 41 is specifically configured to send multiple visible light signals through multiple LED light sources corresponding to different display regions in a display. In addition, sending directions of the multiple different signals are optionally same or different. As shown in FIG. 2A, multiple signal emitting sources (shown by black dots in the figure, the same below) respectively send signals in a same direction, that is, the sending directions of the multiple different signals are parallel; and as shown in FIG. 2B, multiple signal emitting sources respectively send signals in different directions; and as shown in FIG. 2C, one signal emitting source sends at least two signals in at least two different directions.

In the present embodiment, the case that the multiple different signals have different coverage areas means that respective coverage areas of the multiple different signals are totally non-overlapped or the coverage areas of at least two signals are partially overlapped, in addition, the coverage areas of any two signals in the multiple different signals do not have an inclusion relation.

In the present embodiment, the other communication device can be any device with a communication function, which comprises but not limited to a cellphone and a wearable device.

In the present embodiment, since the multiple different signals have different coverage areas, the other communication device respectively receives the at least two signals in at least two positions which are different relative to the communication device 400, and correspondingly, the at least two signals at least partially mark a moving track of the other communication device relative to the communication device 400. For example, the other communication device receives a signal A in a first position relative to the communication device 400 and receives signals B and C in a second position relative to the communication device, then the signal A and signals B and C at least partially mark the moving track of the other communication device relative to the communication device 400.

According to the communication device of the present embodiment, by sending multiple different signals having different coverage areas by the sending module, at least determining at least two signals in the multiple different signals received by another communication device by the first determining module, and at least according to the at least two signals, determining a moving track of the other communication device by the second determining module, the interaction solution is provided. In addition, the moving track of the other communication device is determined based on the signal received by the other communication device from the communication device, thereby interaction distance is relatively flexible and the interaction solution is easy to realize.

The communication device 400 of the present embodiment is further described in some optional example embodiments as below.

In the present embodiment, the multiple different signals can be transmitted in multiple forms.

In one example embodiment, the multiple different signals are transmitted in a form of wave beam, correspondingly, the sending module 41 is specifically configured to:

send multiple different signals through multiple wave beams, wherein the multiple wave beams are formed by at least one signal emitting source of the communication device.

Figure 5A:
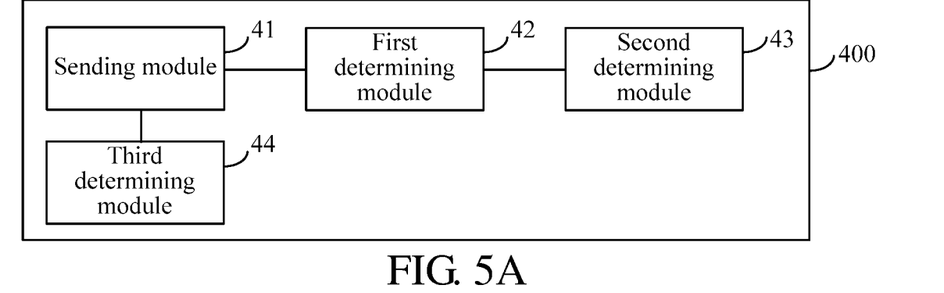
FIG. 5A-FIG. 5C each are example structural schematic diagrams of example embodiment as shown in FIG. 4.

In the present example embodiment, optionally, as shown in FIG. 5A, the communication device 400 further comprises:

a third determining module 44, configured to determine the multiple wave beams to be formed by the at least one signal emitting source.

Specifically, the third determining module 44 has multiple manners to determine the multiple wave beams to be formed by the at least one signal emitting source.

In one possible scene, the multiple wave beams to be formed by the at least one signal emitting source are preset.

Figure 5B:
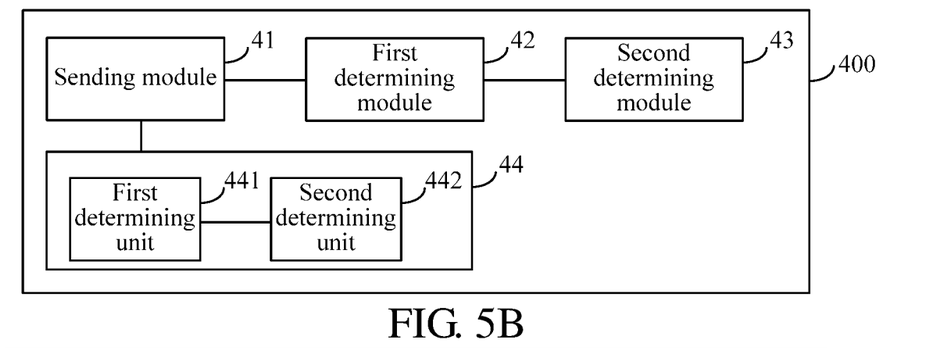

In another possible scene, the third determining module 44 determines the multiple wave beams to be formed by the at least one signal emitting source according to possible moving tracks of the other communication device. Correspondingly, as shown in FIG. 5B, the third determining module 44 comprises:

a first determining unit 441, configured to determine multiple possible moving tracks of the other communication device; and a second determining unit 442, configured to determine the multiple wave beams to be formed by the at least one signal emitting source according to the multiple possible moving tracks, wherein, each possible moving track corresponds to at least two wave beams in the multiple wave beams.

In the above scene(s) of determining the multiple wave beams according to the multiple possible moving tracks, the first determining unit 441 has multiple example embodiments to determine the multiple possible moving tracks.

Optionally, the first determining unit 441 is specifically configured to, at least according to a current position of the other communication device relative to the communication device, determine the multiple possible moving tracks of the other communication device.

Optionally, the multiple possible moving tracks are preset and are unrelated to the current position of the other communication device relative to the communication device 400.

In the present embodiment, the moving track of the other communication device determined by the second determining module 43 is optionally determined only according to the at least two signals received by the other communication device, or according to the at least two signals received by the other communication device and a receiving sequence that the other communication device receives the at least two signals. In the latter scene, optionally, the first determining module 42 is specifically configured to determine the at least two signals received by the other communication device and a receiving sequence that the other communication device receives the at least two signals;

the second determining module 43 is specifically configured to, at least according to the at least two signals and the receiving sequence, determine a moving track of the other communication device.

The first determining module 42 has multiple example embodiments to determine the at least two signals and the receiving sequence.

Optionally, the first determining module 42 is specifically configured to:

receive the at least two signals returned in sequence by the other communication device; and determine the receiving sequence as a returning sequence that the other communication device returns the at least two signals.

Optionally, the first determining module 42 is specifically configured to:

receive the at least two signals and at least two receiving moments that the other communication device receives the at least two signals, which are both returned by the other communication device; and according to the at least two receiving moments, determine the receiving sequence.

In the above scene(s) of considering the receiving sequence, the second determining module 43 has many example embodiments to determining the moving track of the other communication device at least according to the at least two signals and the receiving sequence.

Optionally, the second determining module 43 is specifically configured to:

determine at least two coverage areas of the at least two signals; and according to the at least two coverage areas of the at least two signals and the receiving sequence, determine a moving track of the other communication device.

Figure 5C:
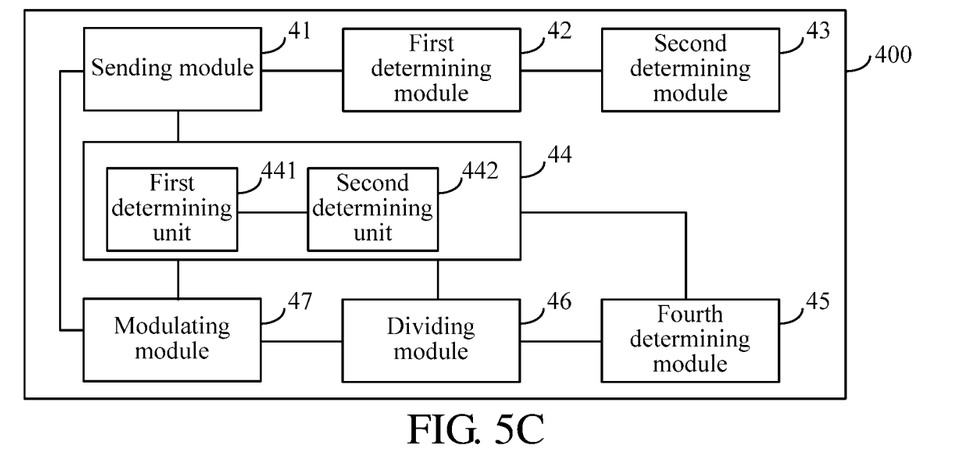

In the scene(s) combining the above receiving sequence and the above determining the wave beams according to possible moving tracks, optionally, as shown in FIG. 5C the communication device 400 further comprises:

a fourth determining module 45, configured to determine first sequences respectively corresponding to the multiple possible moving tracks;

a dividing module 46, configured to: aiming at each first sequence corresponding to each possible moving track, according to at least two wave beams corresponding to the possible moving track and a corresponding order of the at least two wave beams to the possible moving track, divide the first sequence into at least two subsequences corresponding to the at least two wave beams one to one; and a modulating module 47, configured to respectively modulate the at least two subsequences into at least two signals corresponding to the at least two wave beams.

In the scene(s) combining the above receiving sequence and the above dividing the first sequence, optionally, the first determining module 42 is specifically configured to: receive a second sequence from the other communication device, wherein the second sequence is made up of the at least two subsequences carried in the at least two signals according to the receiving sequence by the other communication device.

Further, the second determining module 43 is specifically configured to determine the moving track of the other communication device as one possible moving track corresponding to the second sequence.

In the scene(s) combining the receiving sequence and dividing the first sequence, optionally, the second determining module 43 is specifically configured to:

combine at least two subsequences carried in the at least two signals into a third sequence according to the receiving sequence; and determine the moving track of the other communication device as one possible moving track corresponding to the third sequence.

In the above example embodiment of sending multiple different signals through multiple wave beams, the sending module 41 sends the multiple different signals through the multiple wave beams optionally at different moments.

Further in combination with the scene(s) of determining the wave beams according to the possible moving tracks, optionally, in at least two wave beams corresponding to each possible moving track, the sending module 41 sends a signal through an initial wave beam, and then sends another signal by the next wave beam after the first determining module 42 confirms that the other communication device receives the signal sent through the initial wave beam, and so on. Correspondingly, the sending module 41 is specifically configured to: send at least one first signal through at least one first wave beam, wherein the at least one first wave beam comprises at least one initial wave beam in at least two wave beams corresponding to each of the multiple possible moving tracks;

the first determining module 42 is specifically configured to receive from the other communication device a first acknowledging signal for acknowledging a first signal;

the sending module 41 is further specifically configured to send at least one second signal through at least one second wave beam, the at least one second wave beam comprises at least one next wave beam of a first initial wave beam in at least one possible moving track, the first signal received by the other communication device is sent through the first wave beam by the communication device, each of the at least one possible moving track takes the first wave beam as the initial wave beam;

the first determining module 42 is specifically configured to receive from the other communication device a second acknowledging signal for acknowledging a second signal.

Each example embodiment and each scene of the present embodiment can specifically refer to the corresponding description in the embodiment of an interaction method embodiment provided by the present application.

Figure 6:
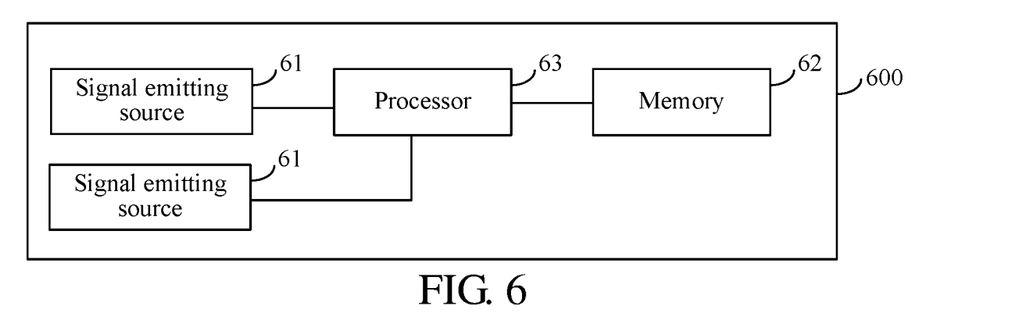
FIG. 6 is a structural schematic diagram of a second example embodiment of a communication device provided by the present application.

FIG. 6 is a structural schematic diagram of a second embodiment of a communication device provided by the present application. As shown in FIG. 6, the communication device 600 comprises:

at least one signal emitting source 61:

a memory 62, configured to store at least one program; and a processor 63, configured to execute the at least one program stored by the memory 62, wherein the at least one program enables the processor 63 to execute following operations:

controlling the at least one signal emitting source 61 to send multiple different signals, wherein the multiple different signals have different coverage areas;

at least determining at least two signals in the multiple different signals received by another communication device; and at least according to the at least two signals, determining a moving track of the other communication device.

In the present embodiment, the communication device 600 can be any device with a communication function, which comprises but not limited to a cellphone, a tablet computer, a smart television, a wearable device and a display.

It should be noted that FIG. 6 only illustrates with two signal emitting sources 61, which is not intended to limit the number of the signal emitting source 61 in the communication device 600.

In the present embodiment, the type of the signal emitting source 61 relates to that of the signal(s) sent by the signal emitting source 61. For example, a signal emitting source 61 emitting electromagnetic wave signals can be an antenna or an antenna array; a signal emitting source 61 emitting light signals can be a light source or a light source array, for example, a LED light source or LED light source array in an OLED display or a LED display; and a signal emitting source 61 emitting sound wave signals can be a loudspeaker or a loudspeaker array. For example, the multiple different signals are multiple visible light signals, the at least one signal emitting source 61 is multiple signal emitting sources 61 and is specifically multiple LED light sources corresponding to different display regions in a display.

In the present embodiment, the memory 62 can optionally comprise a random-access memory (RAM), and optionally further comprise a non-volatile memory, for example, at least one disk storage.

In the present embodiment, the processor 63 can be a central processing unit (CPU), or an application specific integrated circuit (ASIC), or one or more integrated circuits configured to execute the above operations. The above operations that the at least one program enables the processor 63 to execute can refer to corresponding description in the embodiment of an interaction method and is not repeated herein.

Figure 7:
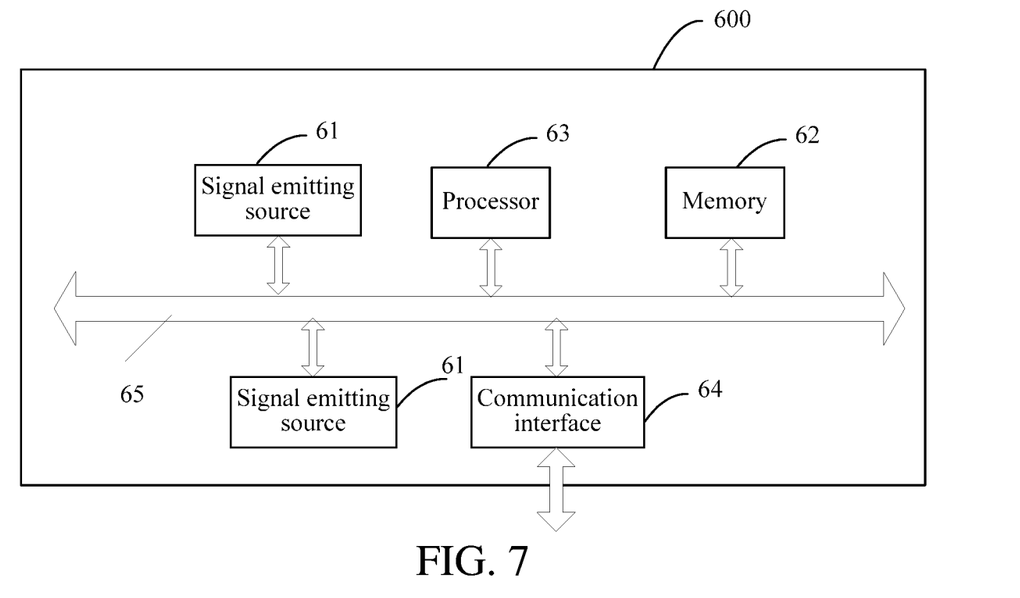
FIG. 7 is a structural schematic diagram of an example embodiment as shown in FIG. 6.

In one example embodiment, as shown in FIG. 7, the communication device 600 further comprises a communication interface 64 and a communication bus 65, wherein multiple signal emitting sources 61, the memory 62, the processor 63 and the communication interface 64 perform communication and control with each other by the communication bus 65.

Effective effects of the present embodiment refer to the corresponding description of the embodiment of an interaction method provided by the present application.

A person of ordinary skill in the art may be aware that, in combination with the examples described in the embodiments disclosed in this specification, units and method steps can be implemented by electronic hardware or a combination of computer software and electronic hardware. Whether these functions are implemented by hardware or software depends on specific applications and design constraint conditions of the technical solution. A person skilled in the art may use different methods to implement the described functions for each specific application, but such implementation should not be construed as a departure from the scope of the present application.

If the functions are implemented in the form of software functional unit and are sold or used as an independent product, the product can be stored in a computer-readable storage medium. Based on this understanding, the technical solution of {\kerning2 the present application} essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing computer-readable storage medium comprises physical volatile and non-volatile, removable and non-removable mediums that are implemented in any method or technology for storage of information such as computer-readable instructions, data structures, program modules or other data. The computer-readable storage medium specifically comprises, but is not limited to, a USB flash drive, a removable hard disk, a read-only memory (ROM), a random access memory (RAM), a diskette or a compact disk and other mediums capable of storing a program code.

The foregoing example embodiments are used to describe present application, but not to limit the present application. A person of ordinary skill in the art can still make various alterations and modifications without departing from the spirit and scope of the present application; therefore, all equivalent example embodiments also fall within the scope of the present application, and the patent protection scope of present application should be subject to the claims.

What is claimed is:

1. A method, comprising:
sending different signals through wave beams by a communication device comprising a processor, wherein the different signals have different coverage areas;
at least determining at least two signals in the different signals received by another communication device and a receiving sequence in which the other communication device receives the at least two signals; and
at least according to the at least two signals and the receiving sequence, determining a moving track of the other communication device,
wherein the sending the different signals through the wave beams by the communication device comprises:
sending at least one first signal through at least one first wave beam of the wave beams by the communication device,
wherein the at least one first wave beam comprises at least one initial wave beam in at least two wave beams corresponding to each of possible moving tracks, and
wherein the determining the at least two signals received by the other communication device and the receiving sequence in which the other communication device receives the at least two signals comprises:
receiving from the other communication device a first acknowledging signal for acknowledging a first signal;
wherein the sending the different signals through the wave beams by the communication device further comprises:
sending at least one second signal through at least one second wave beam of the wave beams by the communication device, wherein the at least one second wave beam comprises at least one next wave beam of the at least one first wave beam in at least one possible moving track, the first signal received by the other communication device is sent through the first wave beam by the communication device, and each of the at least one possible moving track takes the at least one first wave beam as the initial wave beam; and
wherein the determining the at least two signals received by the other communication device and the receiving sequence in which the other communication device receives the at least two signals further comprises:
receiving from the other communication device a second acknowledging signal for acknowledging a second signal.

2. The method of claim 1, wherein
the wave beams are formed by at least one signal emitting source of the communication device.

3. The method of claim 2, further comprising:
before the sending the different signals through the wave beams by the communication device, determining the wave beams to be formed by the at least one signal emitting source by the communication device.

4. The method of claim 3, wherein the determining the wave beams to be formed by the at least one signal emitting source by the communication device comprises:
determining possible moving tracks of the other communication device; and
determining the wave beams to be formed by the at least one signal emitting source according to the possible moving tracks, wherein, each possible moving track of the possible moving tracks corresponds to at least two wave beams in the wave beams.

5. The method of claim 4, wherein the determining possible moving tracks of the other communication device comprises:
at least according to a current position of the other communication device relative to the communication device, determining the possible moving tracks of the other communication device.

6. The method of claim 1, wherein the method further comprises:
determining first sequences respectively corresponding to the possible moving tracks;
aiming at each first sequence corresponding to one possible moving track, according to at least two wave beams corresponding to the possible moving track and a corresponding order of the at least two wave beams corresponding to the possible moving track, dividing the first sequence into at least two subsequences corresponding to the at least two wave beams on a one to one basis; and
respectively modulating the at least two subsequences into the at least two signals corresponding to the at least two wave beams.

7. The method of claim 6, wherein the determining the at least two signals received by the other communication device and the receiving sequence according to which the other communication device receives the at least two signals comprises:
receiving a second sequence from the other communication device, wherein the second sequence is made up of at least two subsequences carried in the at least two signals according to the receiving sequence by the other communication device.

8. The method of claim 7, wherein the determining the moving track of the other communication device comprises:
determining the moving track of the other communication device as one possible moving track corresponding to the second sequence.

9. The method of claim 6, wherein the determining the moving track of the other communication device comprises:

combining at least two subsequences carried in the at least two signals into a third sequence according to the receiving sequence; and determining the moving track of the other communication device as one possible moving track corresponding to the third sequence.

10. The method of claim 1, wherein the determining the at least two signals received by the other communication device and the receiving sequence according to which the other communication device receives the at least two signals comprises:

receiving the at least two signals returned in sequence by the other communication device; and determining the receiving sequence as a returning sequence according to which the other communication device returns the at least two signals.

11. The method of claim 1, wherein the determining the at least two signals received by the other communication device and the receiving sequence according to which the other communication device receives the at least two signals comprises:

receiving the at least two signals and at least two receiving moments at which the other communication device respectively receives the at least two signals, which are both returned by the other communication device; and according to the at least two receiving moments, determining the receiving sequence.

12. The method of claim 1, wherein the determining the moving track of the other communication device, comprises:

determining at least two coverage areas of the at least two signals; and according to the at least two coverage areas of the at least two signals and the receiving sequence, determining the moving track of the other communication device.

13. The method of claim 1, wherein the different signals comprise at least one of electromagnetic wave signals, light signals or sound wave signals.

14. The method of claim 1, wherein the different signals are visible light signals; and wherein the sending the different signals by the communication device comprises:

sending visible light signals through light emitting diode (LED) light sources corresponding to different display regions in a display by the communication device.

15. A communication device, comprising:

a memory that stores executable modules; and a processor, coupled to the memory, that executes or facilitates execution of the executable modules, the executable modules comprising:

a sending module configured to send multiple different signals via multiple wave beams, wherein the multiple different signals have different coverage areas;

a first determining module configured to at least determine at least two signals in the multiple different signals received by another communication device and a receiving sequence in which the other communication device receives the at least two signals; and a second determining module configured to, at least according to the at least two signals and the receiving sequence, determine a moving track of the other communication device, wherein the sending module is configured to send at least one first signal via at least one first wave beam, wherein the at least one first wave beam comprises at least one initial wave beam in at least two wave beams corresponding to each of multiple possible moving tracks, wherein the first determining module is configured to receive from the other communication device a first acknowledging signal for acknowledging a first signal, wherein the sending module is configured to send at least one second signal via at least one second wave beam, wherein the at least one second wave beam comprises at least one next wave beam of the first wave beam in at least one possible moving track, the first signal received by the other communication device is sent via the first wave beam, and each of the at least one possible moving track takes the first wave beam as the initial wave beam, and wherein the first determining module is configured to receive from the other communication device a second acknowledging signal for acknowledging a second signal.

16. The communication device of claim 15, wherein the multiple wave beams are formed by at least one signal emitting source of the communication device.

17. The communication device of claim 16, wherein the communication device further comprises:

a third determining module configured to determine the multiple wave beams to be formed by the at least one signal emitting source.

18. The communication device of claim 17, wherein the third determining module comprises:

a first determining unit configured to determine multiple possible moving tracks of the other communication device; and a second determining unit configured to determine the multiple wave beams to be formed by the at least one signal emitting source according to the multiple possible moving tracks, wherein, each possible moving track corresponds to at least two wave beams in the multiple wave beams.

19. The communication device of claim 15, wherein the executable modules further comprise:

a fourth determining module configured to determine first sequences respectively corresponding to the multiple possible moving tracks;

a dividing module configured to aim at each first sequence corresponding to a possible moving track, according to at least two wave beams corresponding to the possible moving track and a corresponding order of the at least two wave beams to the possible moving track, divide the first sequence into at least two subsequences corresponding to the at least two wave beams one to one; and a modulating module configured to respectively modulate the at least two subsequences into the at least two signals corresponding to the at least two wave beams.

20. The communication device of claim 19, wherein the first determining module is configured to receive a second sequence from the other communication device, and wherein the second sequence is made up of at least two subsequences carried in the at least two signals according to the receiving sequence by the other communication device.

21. The communication device of claim 20, wherein the second determining module is configured to determine the moving track of the other communication device as a possible moving track corresponding to the second sequence.

22. The communication device of claim 19, wherein the second determining module is configured to:
combine at least two subsequences carried in the at least two signals into a third sequence according to the receiving sequence; and
determine the moving track of the other communication device as a possible moving track corresponding to the third sequence.

23. The communication device of claim 15, wherein the first determining module is further configured to:
receive the at least two signals returned in sequence by the other communication device; and
determine the receiving sequence as a returning sequence in which the other communication device returns the at least two signals.

24. The communication device of claim 15, wherein the first determining module is further configured to:
receive the at least two signals and at least two receiving moments that the other communication device receives the at least two signals, which are both returned by the other communication device; and
according to the at least two receiving moments, determine the receiving sequence.

25. The communication device of claim 15, wherein the second determining module is further configured to:
determine at least two coverage areas of the at least two signals; and
according to the at least two coverage areas of the at least two signals and the receiving sequence, determine the moving track of the other communication device.

26. The communication device of claim 18, wherein the first determining unit is configured to:
at least according to a current position of the other communication device relative to the communication device, determine the multiple possible moving tracks of the other communication device.

27. The communication device of claim 15, wherein the multiple different signals comprise at least one of an electromagnetic wave signal, a light signal or a sound wave signal.

28. The communication device of claim 15, wherein the multiple different signals are visible light signals; and
wherein the sending module is configured to send multiple visible light signals via multiple light emitting diode (LED) light sources corresponding to different display regions in a display.

29. A communication device, comprising:
at least one signal emitting source;
a memory configured to store at least one program; and
a processor configured to execute the at least one program stored by the memory, wherein the at least one program enables the processor to execute operations, comprising:
controlling the at least one signal emitting source to send multiple different signals through wave beams by the communication device, wherein the multiple different signals have different coverage areas;
determining at least two signals in the multiple different signals received by another communication device and a receiving sequence in which the other communication device receives the at least two signals; and
according to the at least two signals and the receiving sequence, determining a moving track of the other communication device,
wherein the sending the different signals through the wave beams by the communication device comprises:
sending at least one first signal through at least one first wave beam of the wave beams by the communication device,
wherein the at least one first wave beam comprises at least one initial wave beam in at least two wave beams corresponding to each of possible moving tracks, and
wherein the determining the at least two signals received by the other communication device and the receiving sequence in which the other communication device receives the at least two signals comprises:
receiving from the other communication device a first acknowledging signal for acknowledging a first signal;
wherein the sending the different signals through the wave beams by the communication device further comprises:
sending at least one second signal through at least one second wave beam of the wave beams by the communication device, wherein the at least one second wave beam comprises at least one next wave beam of the at least one first wave beam in at least one possible moving track, the first signal received by the other communication device is sent through the first wave beam by the communication device, and each of the at least one possible moving track takes the at least one first wave beam as the initial wave beam; and
wherein the determining the at least two signals received by the other communication device and the receiving sequence in which the other communication device receives the at least two signals further comprises:
receiving from the other communication device a second acknowledging signal for acknowledging a second signal.

30. The communication device of claim 29, wherein the wave beams are formed by at least one signal emitting source of the communication device.

31. A computer readable storage device comprising executable instructions that, in response to execution, cause a device comprising a processor to perform operations, comprising:
controlling a communication device to send multiple different signals through wave beams, wherein the multiple different signals have different coverage areas;
at least determining at least two signals in the multiple different signals received by another communication device and a receiving sequence in which the other communication device receives the at least two signals; and
at least according to the at least two signals and the receiving sequence, determining a moving track of the other communication device,
wherein the sending the different signals through the wave beams by the communication device comprises:
sending at least one first signal through at least one first wave beam of the wave beams by the communication device,
wherein the at least one first wave beam comprises at least one initial wave beam in at least two wave beams corresponding to each of possible moving tracks, and
wherein the determining the at least two signals received by the other communication device and the receiving sequence in which the other communication device receives the at least two signals comprises:

receiving from the other communication device a first acknowledging signal for acknowledging a first signal;

wherein the sending the different signals through the wave beams by the communication device further comprises:

sending at least one second signal through at least one second wave beam of the wave beams by the communication device, wherein the at least one second wave beam comprises at least one next wave beam of the at least one first wave beam in at least one possible moving track, the first signal received by the other communication device is sent through the first wave beam by the communication device, and each of the at least one possible moving track takes the at least one first wave beam as the initial wave beam; and wherein the determining the at least two signals received by the other communication device and the receiving sequence in which the other communication device receives the at least two signals further comprises:

receiving from the other communication device a second acknowledging signal for acknowledging a second signal.

32. The computer readable storage device of claim 31, wherein the wave beams are formed by at least one signal emitting source of the communication device.

\* \* \* \* \*